US010430452B2

(12) United States Patent
Ross et al.

(10) Patent No.: US 10,430,452 B2
(45) Date of Patent: *Oct. 1, 2019

(54) ADAPTIVE MUSIC AND VIDEO RECOMMENDATIONS

(71) Applicant: Google Inc., Mountain View, CA (US)

(72) Inventors: David Alexander Ross, San Jose, CA (US); Christopher Tim Althoff, San Jose, CA (US); Huazhong Ning, San Jose, CA (US); Mohamad Tarifi, San Francisco, CA (US); Douglas Eck, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/453,156

(22) Filed: Mar. 8, 2017

(65) Prior Publication Data
US 2017/0177572 A1 Jun. 22, 2017

Related U.S. Application Data

(63) Continuation of application No. 14/172,770, filed on Feb. 4, 2014, now Pat. No. 9,619,470.

(51) Int. Cl.
G06F 16/435 (2019.01)
G06F 16/00 (2019.01)
G06F 16/48 (2019.01)
G06F 16/2457 (2019.01)
G06F 16/438 (2019.01)

(52) U.S. Cl.
CPC .......... *G06F 16/435* (2019.01); *G06F 16/00* (2019.01); *G06F 16/24578* (2019.01); *G06F 16/4387* (2019.01); *G06F 16/48* (2019.01)

(58) Field of Classification Search
CPC ........ G06F 17/30772; G06F 17/30017; G06F 17/3053; G06F 17/30029; G06F 16/4387; G06F 16/24578; G06F 16/00; G06F 16/48
USPC .......................... 707/E17.009, 722, 751, 737
See application file for complete search history.

(56) References Cited

U.S. PATENT DOCUMENTS 8,433,762 B1 4/2013 Wald et al.
8,682,722 B1 3/2014 Des Jardins et al.
8,813,120 B1 8/2014 Kosslyn
8,954,346 B1 2/2015 Walker et al.
(Continued)

OTHER PUBLICATIONS

Extended European Search Report dated Aug. 17, 2017, on application No. 15745848.0.
(Continued)

*Primary Examiner* — Robert W Beausoliel, Jr.
*Assistant Examiner* — Pedro J Santos
(74) *Attorney, Agent, or Firm* — Lowenstein Sandler LLP

(57) ABSTRACT

The user feedback module receives from a user device a selection of a seed media item. The seed media item includes a seed label. The user feedback module further generates a list, the list includes the seed label and a set of related labels based on the seed label. The seed label and each related label include a separate label weight. The user feedback module also identifies multiple media items associated with an associate label. The associate label includes at least one of the seed label or a related label of the first set of related labels. The user feedback module also transmits to the user device a first media item from the multiple media items. The user feedback module adjusts the label weight of the associate label based on a user feedback on the first media item.

20 Claims, 9 Drawing Sheets

(56) References Cited

U.S. PATENT DOCUMENTS

| | | | |
|---|---|---|---|
| 9,619,470 | B2 | 4/2017 | Ross et al. |
| 2002/0194607 | A1 | 12/2002 | Connelly |
| 2004/0040040 | A1 | 2/2004 | Danker et al. |
| 2006/0206478 | A1 | 9/2006 | Glaser et al. |
| 2006/0212442 | A1 | 9/2006 | Conrad et al. |
| 2006/0212444 | A1 | 9/2006 | Handman et al. |
| 2008/0049027 | A1 | 2/2008 | Hauke |
| 2008/0189272 | A1 | 8/2008 | Powers et al. |
| 2008/0209320 | A1 | 8/2008 | Mawhinney et al. |
| 2009/0006375 | A1 | 1/2009 | Lax et al. |
| 2009/0049408 | A1 | 2/2009 | Naaman et al. |
| 2010/0162115 | A1 | 6/2010 | Ringewald et al. |
| 2010/0205166 | A1 | 8/2010 | Boulter et al. |
| 2011/0295780 | A1 | 12/2011 | Tyson et al. |
| 2012/0042245 | A1 | 2/2012 | Askey et al. |
| 2012/0123977 | A1 | 5/2012 | Takagi et al. |
| 2012/0143996 | A1 | 6/2012 | Liebald et al. |
| 2012/0144000 | A1 | 6/2012 | Nogami et al. |
| 2012/0259707 | A1 | 10/2012 | Thielke et al. |
| 2012/0274846 | A1 | 11/2012 | Kimura et al. |
| 2012/0290621 | A1 | 11/2012 | Heitz, III et al. |
| 2013/0036081 | A1 | 2/2013 | Tateno |
| 2013/0124533 | A1 | 5/2013 | Yadav et al. |
| 2013/0179439 | A1 | 7/2013 | Handman et al. |
| 2013/0204825 | A1 | 8/2013 | Su |
| 2014/0006556 | A1 | 1/2014 | Shapiro et al. |
| 2014/0040010 | A1 | 2/2014 | Garcia-Martinez |
| 2014/0067827 | A1 | 3/2014 | Bilinski et al. |
| 2014/0074598 | A1 | 3/2014 | Naiem |
| 2014/0074861 | A1 | 3/2014 | Bieschke et al. |
| 2014/0074866 | A1 | 3/2014 | Shah et al. |
| 2014/0157295 | A1 | 6/2014 | Jagtiani et al. |
| 2014/0281972 | A1 | 9/2014 | Kramer et al. |

OTHER PUBLICATIONS

International Search Report and Written Opinion for PCT/US2015/014489, dated May 14, 2015.

Pampalk, Pohle, and Widmer. Dynamic Playlist Generation Based on Skipping Behavior. Austrian Research Institute for Afrtificial Intelligence (OAFI). Vienna, Austria. 2005. 4 pages.

Blaney and White. Measuring Playlist Diversity for Recommendation Systems. ACM Workshop on Audio and Music Computing for Multimedia. Santa Barbara, CA. Oct. 2006. 6 pages.

Chen et al. Playlist Prediction via Metric Embedding. KDD. Beijing, China. Aug. 2012. 9 pages.

Lee, Jin Ha. How similar is too similar?: Exploring users' perceptions of similarity in playlist evaluation. 12th International Society for Music Information Retrieval Conference (ISMIR 2011). 6 pages.

Deng et al. "Content-based Search of Video Using Color, Texture, and Motion" IEEE, 1997, pp. 534-537 (Included with ISR/WO for the PCT application but not actually cited.).

ADAPTIVE MUSIC AND VIDEO RECOMMENDATIONS

RELATED APPLICATION

This application is a continuation of U.S. patent application Ser. No. 14/172,770, filed Feb. 4, 2014, the entire content of which is hereby incorporated by reference.

TECHNICAL FIELD

This disclosure relates to the field of content delivery platforms and, in particular, to dynamically adapting media content based on user feedback.

BACKGROUND

On the Internet, content delivery platforms or other applications allow users to upload, consume, and share digital content such as media items. Such media items may include audio clips, movie clips, TV clips, and music videos, as well as amateur content such as video blogging, short original videos, pictures, other multimedia content, etc. Users may use computing devices (such as smart phones, cellular phones, laptop computers, desktop computers, netbooks, tablet computers) to use, play, and/or consume the media items (e.g., watch digital videos, listen to digital music).

Currently, users are spending increased amounts of time on content delivery platforms. Similar to a television or radio experience, users typically prefer to watch or listen to content without interruptions or having to decide what content to consume next. Some content delivery platforms allow users to create playlists or stations that allow the user to create a list of favorite media items to automatically play without interruption. However, generation of such playlists or stations is a manual process that can take time and resources to understand and enable. Moreover, these playlists or stations are generally finite and quickly get repetitive and outdated. User interests may vary when consuming content and the manually-generated static station cannot capture the user's dynamic interests.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In one implementation, a method for dynamically adapting media content delivered to a user based on user feedback is disclosed. The method includes receiving from a user device, such as computer or mobile device, a selection of a seed media item. The seed media item includes a seed label. The method further includes generating a list including the seed label and a set of labels related to the seed label. The seed label and related labels each include a separate label weight. The method also includes identifying multiple media items associated with the seed label and/or related labels (i.e., associate label). The method additionally includes transmitting to the user device a media item of the multiple media items of the associate label. The method also includes receiving user feedback from the user device on the media item of the associate label and adjusting the label weight of the associate label based on the user feedback. In one implementation, the label weight is adjusted based on a temporal relation to the user feedback. In one implementation, a label is an artist identifier (e.g., artist), and a media item is a video identifier (e.g., video).

In one implementation, the method includes explicit user feedback such as a like action, a dislike action, a comment, and a sharing action. The method also includes implicit user feedback such as a long watch action, a removal action, or a skip action.

In one implementation, the method includes identifying a second set of related labels based on the adjusted label weight of the associate label. The method also includes updating the list to contain the second set of related labels.

Further, in one implementation, the method includes identifying an additional label when the adjusted label weight of the associate label exceeds a first threshold value. The additional label may be related to the associate label.

In one implementation, the method includes calculating a cumulative weight. The cumulative weight may be the weight of all the separate label weights of the list. The method includes comparing the cumulative weight of the list to a second threshold value. The method further includes replacing one of the more related labels of the list with a second set of related labels when the cumulative weight is under the second threshold. The second set of related labels is based on the seed. In one implementation, the second set of related labels is related to the seed label.

In one implementation, the method includes assigning a media weight to each of the multiple media items associated with an associate label (i.e., seed label or related label). In one implementation, the method includes transmitting to the user device a media item based on the media weight.

Further, in one implementation, the method includes calculating a full-rank weight for each of the plurality of media items associated with the associate label. The full-rank weight may include a combination of label weight and media weight.

In additional implementations, computing devices for performing the operations of the above described implementations are also disclosed. Additionally, in implementations of the disclosure, a computer readable storage media stores methods for performing the operations of the above described implementations.

BRIEF DESCRIPTION OF THE DRAWINGS

The present disclosure is illustrated by way of example, and not by way of limitation, in the figures of the accompanying drawings.

DETAILED DESCRIPTION

Figure 1:
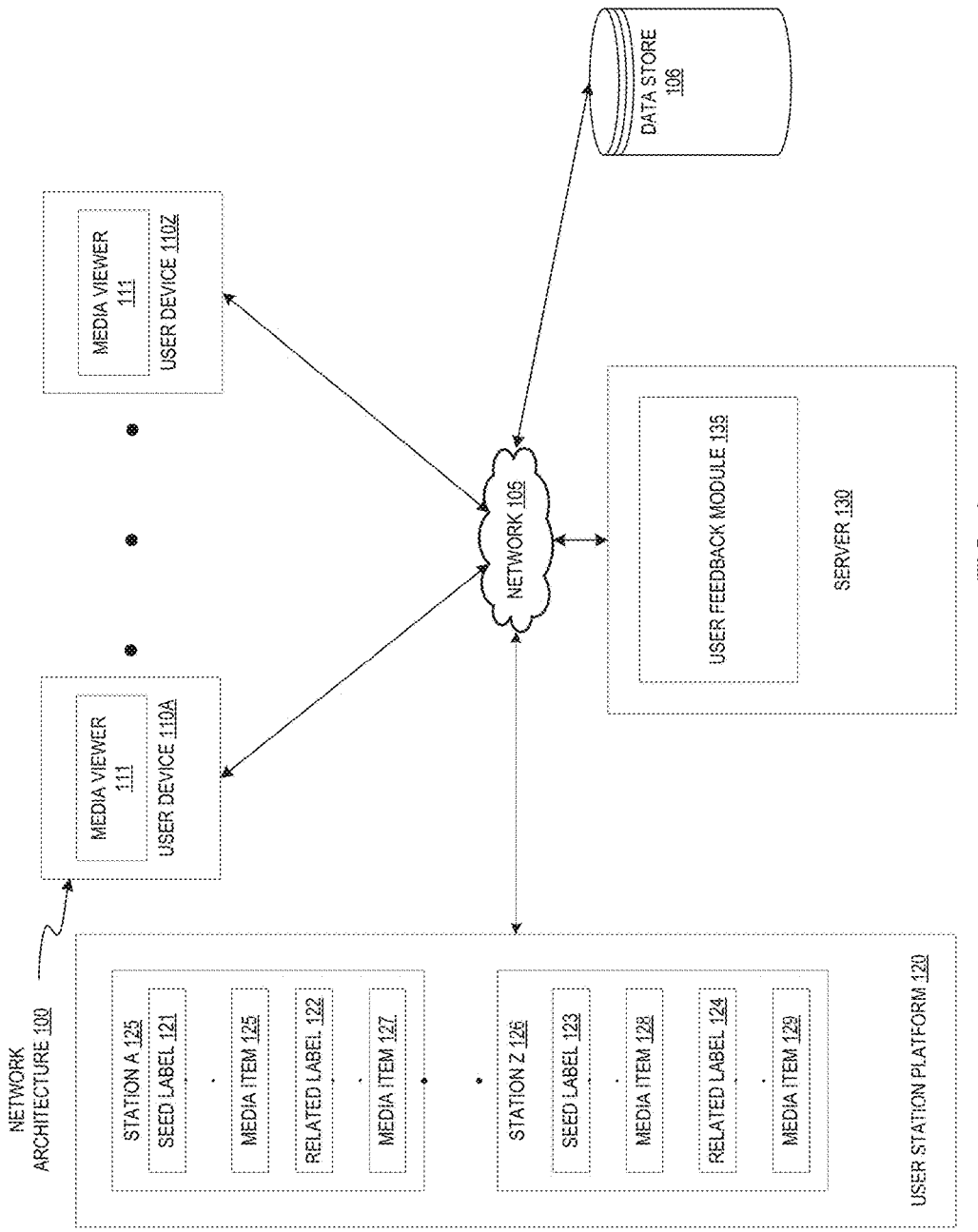
FIG. 1 is a block diagram illustrating an exemplary network architecture in which implementations of the present disclosure may be implemented.

The following disclosure sets forth numerous specific details such as examples of specific systems, components, methods, and so forth, in order to provide a good understanding of several implementations of the present disclosure. It will be apparent to one skilled in the art, however, that at least some implementations of the present disclosure may be practiced without these specific details. In other instances, well-known components or methods are not described in detail or are presented in simple block diagram format in order to avoid unnecessarily obscuring the present disclosure. Thus, the specific details set forth are merely examples. Particular implementations may vary from these example details and still be contemplated to be within the scope of the present disclosure.

Content delivery platforms can include one or more stations and the one or more stations can be consumable over the Internet. A station is a mechanism for providing certain media items and/or for providing access to media items to users. Media items for the station can be selected by a user, uploaded by a user, selected by a content provider, or selected by a broadcaster. Stations allow users to receive, create, customize, and consume media items. Users can create one or more stations, and upon creation, the user can view his or her stations from the homepage of the content hosting site or from a user interface. A station may provide a continuous stream of media items and as such, a user may consume a continuous stream of media content through a station. A station may include a playlist. A playlist may include a list of media items that are played sequentially or in some order. In a station, new media items are continuously added to a station playlist so that playback on a station may continue uninterrupted.

Implementations of the disclosure pertain to dynamically adapting media content for a user based on user feedback. Because of the large number of media items that are currently available on the Internet (e.g., the Web and/or other networks) or from a content sharing platform, users may often have difficulty choosing and/or finding new media items to consume. Implementations of the present disclosure may automatically and dynamically curate media content (i.e., media items) for the user. Feedback from the user (such as "likes," "dislikes," comments, long watch actions, or skip actions) associated with media items may be analyzed in order to determine media content for the user to consume. A station module may create a station based on an initial selection of a media item, i.e., seed media item. A user feedback module may dynamically update a station's media content based on user feedback. A user may modify or delete a station. A user's inaction, for example a user not consuming a media item within a threshold period of time, may cause a station or a station's media content to be modified or deleted. The implementations described herein may allow the user to more easily and more quickly consume media items without manually searching for media items.

For purposes of illustration, examples of some implementations of the present disclosure are provided. A user may search for videos by performing a search query of, for example, classical music. The query may return numerous videos for classical music, and the user may select a video, for example Mozart—The Marriage of Figaro, from the search query results. After the user selects the video, the user may create a station based on video by, for example, clicking a create station button associated with the video (e.g., FIG. 4, button 452). After the user clicks the create station button, the user feedback module (e.g., user feedback module 135) may create the station and use "The Marriage of Figaro," as the seed media item. In this example, the seed media item is the first video from which the station is created. Media content, specifically the initial media content for the station, may be based on the seed media item. For example, from the seed media item, the user feedback module may also determine a seed label associated with the seed media item. In this example, the seed label is Mozart. The user feedback module may curate videos for the station relevant to the seed label. For example, the user feedback module may curate videos by composers such as Bach and Vivaldi. Each composer can be considered a relevant label, that is, relevant to the seed label (e.g., composer), Mozart. The labels, the seed label and the relevant labels, for example Mozart, Bach, and Vivaldi respectively, may have numerous associated media items (e.g., videos). The user feedback module will select video items for each composer to curate the station's playlist. When a user provides user feedback on any media item of a station, the user feedback module may update the labels and associated media items in the station playlist. For example, if the user feedback on the Bach video is positive, the user feedback module may curate more videos of music by Bach or curate videos by composers related to Bach. User feedback may be, for example, a user like of a video, a comment on a video, or a user skipping a video, or the like.

FIG. 1 is a block diagram illustrating an exemplary network architecture in which implementations of the present disclosure may be implemented. In one implementation, the network architecture 100 includes user devices 110A through 110Z, a network 105, a data store 106, a user station platform 120, and a server 130. In one implementation, network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In one implementation, the data store 106 may be may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers).

The user devices 110A through 110Z may each include computing devices such as personal computers (PCs), laptops, mobile phones, smart phones, tablet computers, netbook computers, etc. Each user device may include a media viewer 111. In one implementation, the media viewer 111 may be an application that allows users to view and listen to content, such as images, videos, web pages, documents, music, etc. For example, the media viewer 111 may be a web browser that can access, retrieve, present, and/or navigate content (e.g., web pages such as Hyper Text Markup Language (HTML) pages, digital media items, etc.) served by a web server. The media viewer 111 may render, display, and/or present the content (e.g., a web page, a media viewer) to a user. The media viewer 111 may also display an embedded media player (e.g., a Flash® player or an HTML5 player) that is embedded in a web page (e.g., a web page that may provide information about a product sold by an online merchant). In another example, the media viewer 111 may be a standalone application that allows users to view digital media items (e.g., digital videos, digital images, electronic books). The media viewer 111 may be provided to the user devices 110A through 110Z by the server 130 and/or user station platform 120. For example, the media viewer 111 may be an embedded media player that is embedded in a web page provided by the user station platform 120. In another example, the media viewer 111 may be an application that is downloaded from the server 130.

In one implementation, user station platform 120 may include one or more computing devices (such as a rack mount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items and/or provide the media items to the user. For example, the user station platform 120 may allow a user to consume, upload, search for, play, subscribe, share, select, approve of ("like"), disapprove of ("dislike"), and/or comment on media items. The user station platform 120 may also include a website (e.g., a webpage) that may be used to provide a user with access to the media items. The user station platform 120 may include one or more stations (e.g., stations A 125 through station Z 126). Each station (e.g., stations A 125 through station Z 126) may include one or more seed labels (e.g., seed label 121 and seed label 123, respectively). For example, a user may query videos for electric cars and choose a particular video about the Electric Fox vehicle. When the user creates a station based on the Electric Fox vehicle video, the seed media item may be the Electric Fox vehicle video and the seed label may be electric cars. The seed media item may be the first media item from which the station is created. In another embodiment, a station may have multiple seed labels. For example, the Electric Fox vehicle video may have additional labels such as the content provider providing the Electric Fox vehicle video or the vehicle maker of the Electric Fox vehicle. Each station may include one or more related labels (e.g., related label 122 and related label 124), which relate to the respective seed label (e.g., seed label 121 and seed label 123). For example, in station A 125 related label 122 relates to seed label 121, and in station Z 126 related label 124 relates to seed label 123. For example, a station based on the Electric Fox vehicle with the seed label of electric cars may have related labels such car battery technology and car charging stations. A related label may be related to a seed label (e.g., related label 122 relates to seed label 121) by one or more criteria such as similarity, popularity, etc. Each station may include one or more media items (e.g., media item 125, media item 127, media item 128, and media item 129). For example, station A 125 includes seed label 121 and an associated seed media item (i.e., media item 125), and includes related label 122 and associated media item (i.e., media item 127). For example, a station with seed label of electric cars may have associate seed media items such as videos of different electric vehicles. In addition, the related label of car battery technology may have associate media items such as videos of Korean car battery technology. One or more media items (e.g., media item 125, media item 127, media item 128, and media item 129) may be associated with a respective seed label (e.g., seed label 121 and seed label 123) or related label (e.g., related label 122 and related label 124). For example, media item 125 is associated with seed label 121, and media item 127 is associated with related label 122. In one embodiment, associating a media item with a label means that the contents of the associate media items relate the respective label. For example, if the label is Mozart, videos of songs by Mozart may be related. In another embodiment, associating a media item with a label means that the associate media items are tagged with the label, for example, in the media item's metadata. For example, certain media items, in their metadata, may contain the tag of Mozart. If a video contains a Mozart tag, for example videos of Mozart's life, such videos may be associated with a label.

Examples of a media item (e.g., media item 125, media item 127, media item 128, and media item 129) can include, but are not limited to, digital videos, digital movies, digital photos, digital music, website content, social media updates, electronic books (e-books), electronic magazines, digital newspapers, digital audio books, electronic journals, web blogs, real simple syndication (RSS) feeds, electronic comic books, software applications, and the like. A media item may be consumed via the Internet and/or via a mobile device application. For brevity and simplicity, an online video (also hereinafter referred to as a video) is used as an example of a media item throughout this document. As used herein, "media," "media items," "media content," "online media items," "digital media," and "digital media items" can include electronic files that can be executed or loaded using software, firmware or hardware configured to present the digital media item to an entity. In one implementation, the user station platform 120 may store the media items (e.g., media item 125, media item 127, media item 128, and media item 129) using the data store 106.

In one implementation, server 130 may include one or more computing devices (e.g., a rack mount server, a server computer, etc.). In one implementation, server 130 may be included in the user station platform 120. In another implementation, server 130 may be separate from user station platform 120, but may communicate (e.g., exchange data) with user station platform 120 over network 105 or through another connection. In one implementation, server 130 includes a user feedback module 135. User feedback module 135 may generate related labels (e.g., related label 122 and related label 124) and find associated media items (e.g., media item 127 and media item 129, respectively) based on a seed label (e.g., seed label 121 and seed label 123) and/or user feedback. In one implementation, user feedback module 135 may be a component, module, plug-in or add-on to a media viewer (e.g., media viewer 111) on server 130. In other implementations, user feedback module 135 may be associated with some other piece of software or may be a standalone application, module, or program. Additional details of user feedback module 135 are provided below.

Figure 2:
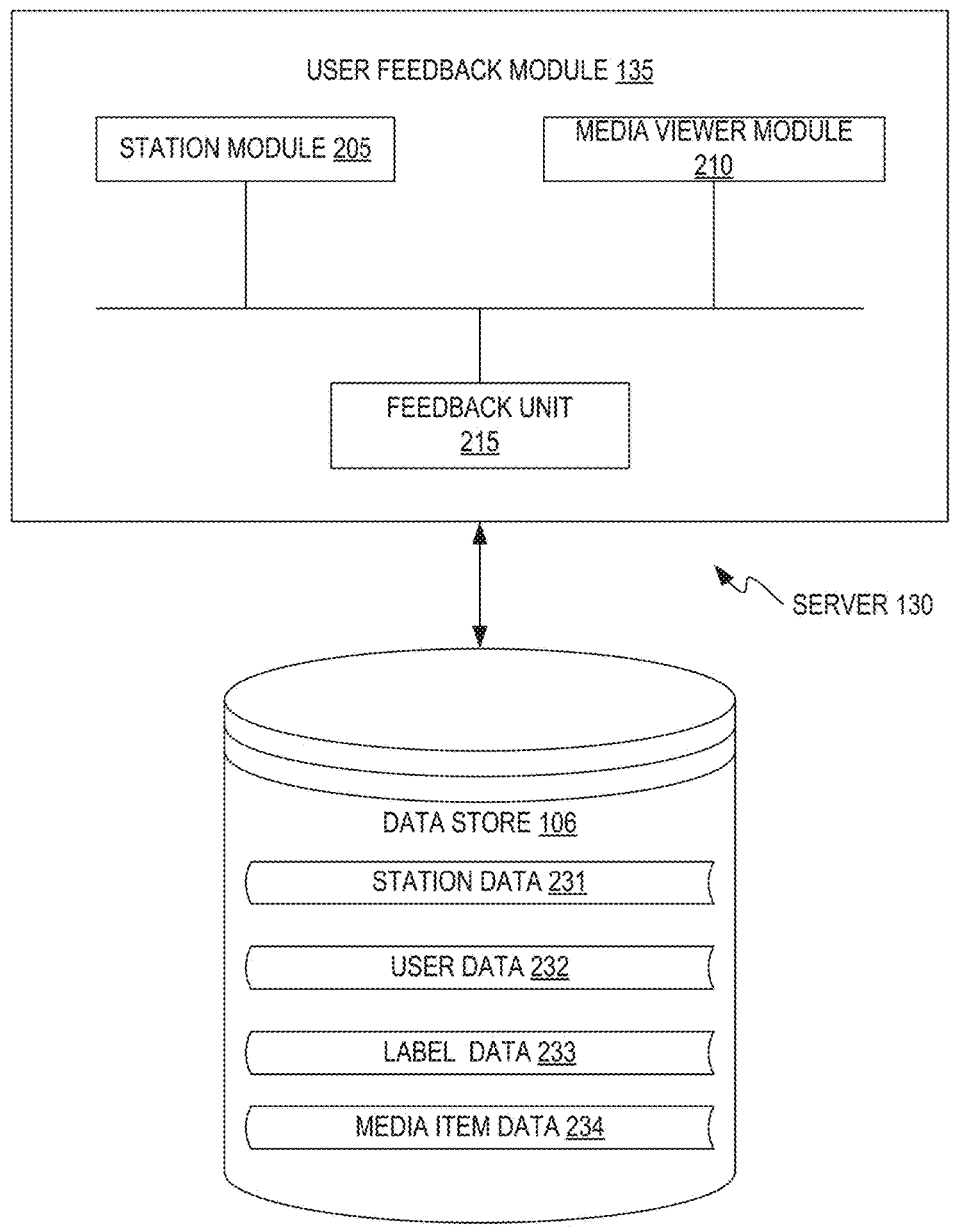
FIG. 2 is a block diagram illustrating user feedback module, according to an implementation.

FIG. 2 is a block diagram illustrating user feedback module, according to one implementation. In one implementation, user feedback module 135 includes station module 205, media viewer module 210, and feedback unit 215. This arrangement of modules, units, or components may be a logical separation, and in other implementations, these modules, units, or other components can be combined together or separated in further components, according to a particular implementation. In one implementation, data store 106 is connected to user feedback module 135 and includes station data 231, user data 232, label data 233, and media item data 234. In one implementation, server 130 may include both user feedback module 135 and data store 106. In another implementation, data store 106 may be external to server 130 and may be connected to server 130 over a network or other connection. In other implementations, server 130 may include different and/or additional components which are not shown to simplify the description. Data store 106 may include one or more mass storage devices which can include, for example, flash memory, magnetic or optical disks, or tape drives; read-only memory (ROM); random-access memory (RAM); erasable programmable memory (e.g., EPROM and EEPROM); flash memory; or any other type of storage medium.

In one implementation, station module 205 manages the creation and editing of stations (e.g., station A 125 through station Z 126) and the selection of media content. A station (e.g., station A 125 through station Z 126) may be, for example, a list of labels (e.g., seed label 121 and related label 122) associated with a collection of media items (e.g., media item 125 and media item 127). A user may consume a continuous stream of media content (e.g., media item 125 and media item 127) through a station (e.g., station A 125). It should be noted that a station (e.g., station A 125 through station Z 126) and a playlist may have some differences. A media playlist may include a list of media items (e.g., media item 125, media item 127, media item 128, and media item 129) that are played sequentially or in some other order. In one implementation, when each media item in the playlist has been played or otherwise consumed by the user, playback of the playlist may end. In contrast, a station (e.g., station A 125 through station Z 126), describes a media tool in which media items (e.g., media item 125, media item 127, media item 128, and media item 129) may be consumed continuously, without end. In one implementation, new media items are continuously added to the station so that playback can continue. It should be noted that the methods and systems described herein may be used for both stations and playlists.

In one implementation, the station module 205 may receive indication of a seed label (e.g., seed label 121 and seed label 123) from a user, another application, or from some other source. For example, a user selects an initial media item (e.g., seed media item 125) that includes a seed label (e.g., seed label 121) and creates a corresponding station (e.g., station A 125). The seed label (e.g., seed label 121) may be stored in data store 106, and may be used to create a new station (e.g., station A 125). The station module 205 may associate the station with a particular user or user account. In one implementation, the user information may be stored in user data 232 in data store 106. The station module 205 may generate a list including the seed label (e.g., seed label 121) and a first set of related labels (e.g., related label 122) based on the seed label. In one implementation, the related labels (e.g., related label 122 and related label 124) and seed label (e.g., seed label 121 and seed label 123) may be stored in label data 233 in data store 106. The station module 205 may identify media items associated with the seed label (e.g., seed label 121) and/or related labels (e.g., related label 122). When a media item (e.g., media item 127) is identified as associated with a label (e.g., related label 122), the label (e.g., related label 122) may be referred to as an associate label. In one implementation, the media items (e.g., media item 127) may be stored in media item data 234 in data store 106.

In one implementation, station module 205 stores the station (e.g., station A 125 through station Z 126), labels (e.g., seed label 121 and related label 122), and media items (e.g., media item 125 and media item 127), and user information as station data 231 in data store 106. The station data 231 may include a group of pointers or other references to the actual media items (e.g., media item 125, media item 127, media item 128, and media item 129) stored in media item data 234. The station data 231 may include a group of pointers or other references to the user data stored in user data 232. The station data 231 may include a group of pointers or other references to the label data stored in label data 233. Each station in station data 231 may be assigned a unique identifier that can be used to differentiate one station from another. When a user attempts to edit a station (e.g. station A 125) or provide feedback on a media item (e.g., media item 127) in a station, station module 205 can retrieve the corresponding station from station data 231 using this unique identifier and perform the editing operations, as appropriate.

Figure 3:
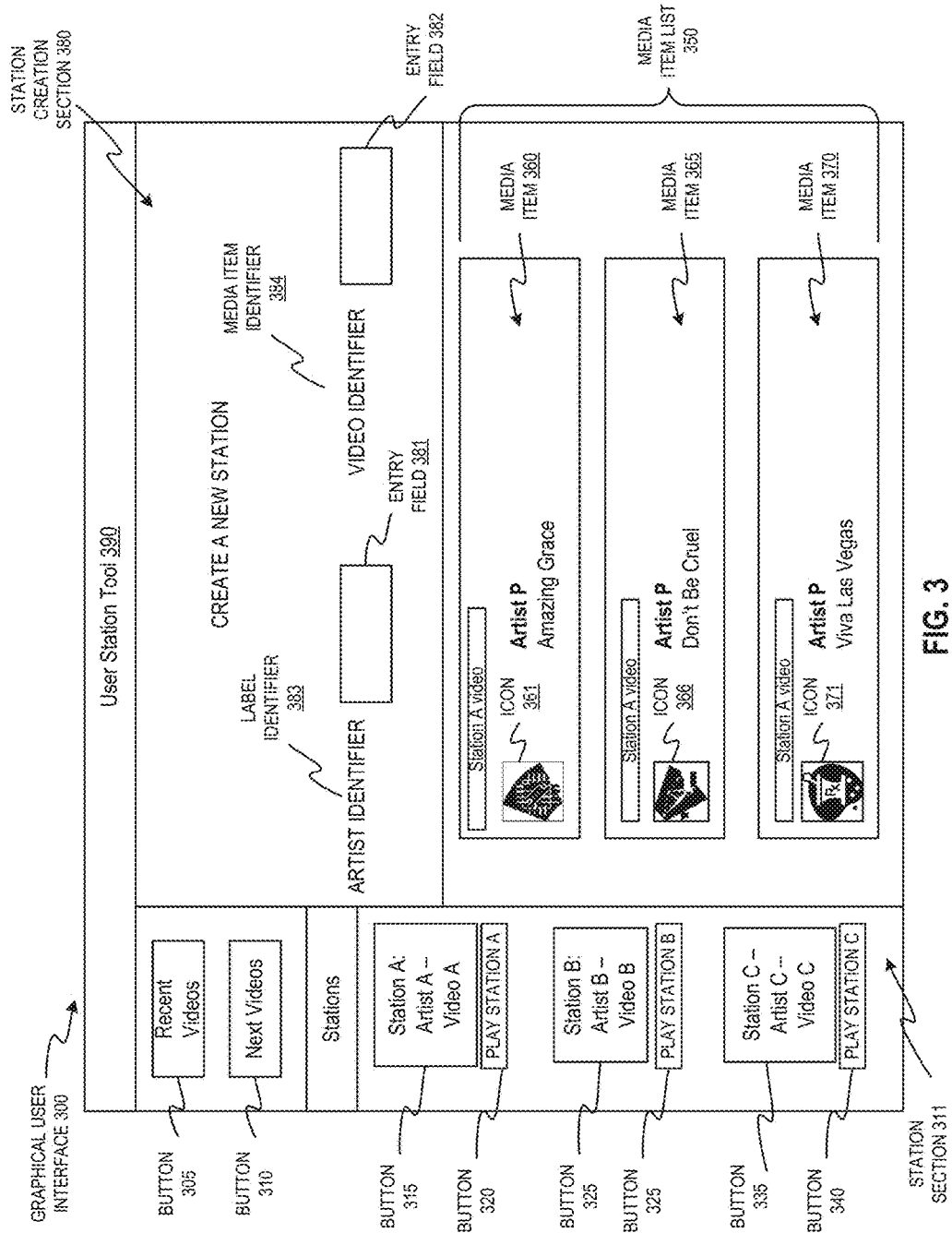
FIG. 3 is a diagram illustrating an example graphical user interface (GUI), in accordance with one implementation of the present disclosure.

In one implementation, media viewer module 210 generates and/or controls interactions with a user interface, such as graphical user interface 300 (GUI) and GUI 400 (described below with respect to FIGS. 3 and 4), that is part of a website or application (e.g., mobile application or app), such as media viewer 111, running on a user device 110A-110Z. For example, media viewer module 210 may display media items, such as media item 125, media item 127, media item 128, and media item 129, in the media portion 405 in GUI 400. In one implementation, media viewer module 210 may also display a station creation section 380 at a location in user station tool 390 where a station may be created, as shown in FIG. 3. The station creation section 380 may take the form of an icon, a symbol, a text block, an arrow, a line, or some other indicator that indicates the location in user station tool 390 where a station (e.g., station A 125 through station Z 126) may be created. In one implementation, media viewer module 210 may also receive a selection of a media item by a user from a user device (e.g., user device 110A though user device 110Z). In one implementation, the media viewer module 210 transmits the information of the selection of a seed media item (e.g., media item 125 and media item 128) from a user to the station module 205 in order to create a station (e.g., station A 125 through station Z 126).

In one implementation, feedback unit 215 receives and/or controls feedback interactions with a user interface, such as graphical user interface 400 (GUI), that is part of a website or application (e.g., mobile application or app), such as media viewer 111, running on a user device 110A-110Z. Feedback unit 215 also processes user feedback in order to generate relevant and customized media content for the user. Feedback from a user device may be received through GUI 400. For example, a user may "like" or "dislike" a media item (e.g., media item 125, media item 127, media item 128, and media item 129) being displayed in media portion 405 of GUI 400 by selecting like button 453 or dislike button 454. The feedback unit 215 may store the feedback data, generated from the feedback interactions, in the user data 232 of data store 106. The feedback unit 215 may generate weights (e.g., label weight 721, label weight 722, temporal weight 880) based on the user feedback. Additionally, the feedback unit 215 may control and transmit the feedback data and weights to station module 205. In response to the feedback data from feedback unit 215, station module 205 may update the related labels (e.g., related label 122 and related label 124) and media items (e.g., media item 125, media item 127, media item 128, and media item 129), as will be described in more detail below.

In one implementation, the feedback unit 215 alone or in conjunction with station module 205 uses user feedback to adjust the media items (e.g., media item 125 and media item 127) delivered to the user in a station. In one implementation, user feedback includes explicit and/or implicit user feedback. Explicit user feedback may include, for example, user "likes," "dislikes," comments, or sharing actions. In one implementation, explicit feedback on media items may include a user's removal action to removed and/or deleted view media items from a station. For example, a removal action may be when a user deletes a media item from the playlist of a station. In one implementation, implicit user feedback may include, for example, long watch actions or skip actions. For example, a skip action may occur when a user moves a media item forward in time, effectively fast-forwarding the media item. Alternatively, a skip action may be when a user skips the play of some or all of a media item by, for example, choosing another media item on the station. A long watch action may be, for example, a period during which a user continuously consumes a media item, or consumes a media item without a skip action or pause. In another implementation, feedback may be measured by a temporal relation to the user feedback. For example, feedback that is received within 30 minutes of the current time may be weighed more heavily than feedback received outside of 30 minutes from the current time. In one implementation, different weights based on the temporal relation to user feedback may affect media content and related labels in a station. In another implementation, user feedback affects the media content for the station, as is described in more detail below with respect to FIGS. 4, 7, and 8.

In another implementation, the media content for a station may be generated by feedback from the user's prior history. In one implementation, a user may perform an action or otherwise use applications after a login under a user ID. The user's actions may be recorded under the user ID associated with the user. A user may have one or more user IDs. The user's actions and information associated with the user ID may be called the user's prior history and stored for example, in user data 232 in data store 106. The user's prior history may be analyzed by feedback unit 215 and sent to station module 205 to curate media content in response to the feedback. For example, a user may generate user history based on social interactions that the user has with other entities (e.g., other users of a content sharing platform, social network, and/or other platforms). For example, the feedback unit 215 may identify other users that communicate with the user (e.g., other users that the user emails, other users with whom the user chats, other users that the user communicates messages with using a social connection platform, etc.). Examples of social interactions may include, but are not limited to, communicating with another user (e.g., a chat message, an email, a text message, a short message service (SMS) message), indicating an approval of a comment, a post, commenting on a post, replying to a post, and/or an action of another user on the content sharing platform and/or a social connection platform, establishing a connection with a user on a social connection platform (e.g., "friending" a user, adding a user as a friend, following a user, adding the user as a social connection, etc.), etc. The feedback unit 215 may identify stations and/or media items that belong to the other users. The feedback unit 215 may also identify media items that the other users have previously consumed (e.g., viewed and/or listened to). The feedback unit 215 alone, or in connection with station module 205, can generate weights or curate media content based on the other media items that belong to the other users and/or that the other users have previously consumed. In another example, the feedback unit 215 may also analyze a user's social interactions (e.g., analyze the emails, chats, messages, and/or posts) in order to customize media content, i.e., include media items in a station that are of interest to the user. In another implementation, the feedback unit 215 may generate weights based on user history provided by the user. For example, the user may voluntarily provide input indicating the user's interests, preferences, likes, dislikes, hobbies, employment, geographical location, personal information, and/or other demographic information. The feedback unit 215 may identify media items that may be of interest to the user based on the personal information and/or other demographic information voluntarily provided by the user.

In one implementation, the feedback unit 215 alone or in conjunction with station module 205 continuously and dynamically updates the labels and associated media items of a station based on user feedback.

FIG. 3 is a diagram illustrating an example graphical user interface (GUI), in accordance with one implementation of the present disclosure. In FIG. 3, GUI 300 may be a homepage (e.g., a main page) of a user of a content delivery platform. For example, GUI 300 may be presented by and/or displayed within a web browser when the user accesses or logs into the content delivery platform via the web browser. In another implementation, GUI 300 may be a home interface or a main interface presented by media viewer 111 (e.g., an app, an application, a program, a software module/component, etc., that may be used to view, play, and/or consume media items). Although GUI 300 is illustrated using buttons (e.g., buttons 305, 310, 315, etc.), other implementations may use links and/or other graphical user interface controls or elements in place of one or more of the buttons.

GUI 300 includes buttons 305 and 310. Button 305 may allow the user to view a history of the media items that the user has consumed (e.g., viewed or played) on a particular station. For example, when the user selects and/or activates the button 305, a new GUI that includes a list of the last (e.g., ten, twenty, fifty or hundred) media items viewed by the user may be presented to the user. The button 310 may allow a user to view future media items that the user may consume for a particular station. A media viewer (e.g., media player 490) may play the media items on a station in the order in which the media items are listed on the station. A user may also transition between media items on a station. For example, a user may wait for the next media item on the station to play or may select a particular media item in the station list.

The GUI 300 also includes a station section 311 that includes a list of one or more stations that the user created and is currently active. In one implementation, the station section 311 may include a list of all stations to which the user is linked, for example, through an indication stored in user data 232 in data store 106. In another implementation, the station section 311 may include a subset of stations to which the user created. For example, the station section 311 may present a predefined number of stations (e.g., 3 stations), the stations that the user accesses most frequently, the stations that the user has accessed most recently, the stations that the user has most recently created, etc. Other mechanisms of determining the stations to include in a subset of stations displayed can be used without departing from the scope of the disclosure.

As illustrated in FIG. 3, the station section 311 includes buttons 315, 325, and 335. Button 315 is labeled "Station A" to indicate that that user is subscribed to Station A, button 325 is labeled "Station B" to indicate that that user is subscribed to Station B, and button 335 is labeled "Station C" to indicate that that user is subscribed to Station C. In one implementation, a list of media items in a station may be presented to the user when the user activates a corresponding button for the station. For example, if the user activates (e.g., clicks on or selects) button 315, the GUI 300 may display a partial list of videos that are in Station A (e.g., media item list 350). In one implementation, when a user activates (e.g., clicks, selects, etc.) one of the buttons 315 through 335, a menu may appear on the GUI 300 listing media items associated with the station. In another implementation, when a user activates (e.g., clicks, selects, etc.) one of the buttons 315 through 335, a popup window including a graphic representation (e.g., picture of a single frame from the media item) of media items in the station associated with the activated button may appear on the GUI 300. It should be understood that in other implementations, other visual indicators such as graphic representations, and/or text can be presented to a user to provide stations to the user.

The GUI 300 also includes a station creation section 380. Station creation section 380 provides a user an interface to create stations. In one implementation, a station may be created by entering a label identifier 383 (e.g., artist identifier) in entry field 381, and further selecting a media item from media item list 350. For example, a user may enter Artist P into label identifier 383. In response, the user station tool 390 populates and displays a number of media items associated with Artist P in media item list 350. When a user selects, for example, media item 370 (i.e., Artist P video "Viva Las Vegas") from media item list 350, the selected media item 370 is categorized as a seed media item (e.g., Viva Las Vegas video), with a seed label (e.g., Artist P). Subsequently, a new station may be created based on the selected media item 370. For example, the new station may be Station X: Artist P—Viva Las Vegas.

In one implementation, a station may be created by entering a media item identifier 384 (e.g., video identifier) in entry field 382, and further selecting a media item from media item list 350. For example, a user may enter "Amazing Grace" into media item identifier 384. In response, the user station tool 390 populates and displays a number of media items associated with "Amazing Grace" in media item list 350. In this example, the user station tool 390 may in response to media item identifier 384—"Amazing Grace"—display a list of media items associated with "Amazing Grace." The media items may be from many different artists or content creators, but all will be associated with "Amazing Grace." When a user selects a media item from media item list 350, the selected media item is categorized as a seed media item (e.g., Amazing Grace), with a seed label (e.g., Artist P). Subsequently, a new station may be created based on the selected media item.

In another implementation, a station may be created by entering both a label identifier 383 and media item identifier 384, and further selecting a media item from media item list 350. In such a case, user station tool 390 populates media item list 350 based on both the entered label identifier 383 and media item identifier 384. The remaining steps of creating a station are the same as disclosed above.

The station creation section 380 also includes button 320, button 325, and button 340. When a user activates (e.g., clicks, selects, etc.), for example, button 320, a media player (as discussed below in conjunction with FIG. 4) may begin playback of the media items included in Station A. For example, the media player (e.g. media player 490) may begin playback of the media items included in Station A starting with the highest ranked or weighted media item in the Station A media item list. In another example, the media player (e.g. media player 490) may begin playback of the media item at the point where the user disconnected from media player 490/station or paused a media item. In another example, the media player (e.g. media player 490) may select any of the media items of Station A.

As illustrated in FIG. 3, the media item list 350 includes media item 360, media item 365, and media item 370. Each media item (e.g., media item 360, media item 365, and media item 370) may include information such as, the title of a media item, information about the media item, and an icon for the media item. For example, the media item 360 includes information that media item 360 is a "Station A video," includes the title of the video (e.g., Amazing Grace), the artist (e.g., Artist P), and an icon 361. An icon (e.g., icon 361, icon 326, or icon 371) may be text, a thumbnail, an image, a frame, and/or some other graphic used to represent the media item for the media item. Although a list of media items are shown as being included in the media item list 350, it should be understood that in other implementations, other information may be shown in media item list of GUI 300. For example, an image (e.g., a JPEG) may be shown in the GUI 300. In another example, digital music (e.g., an MP3) may be played in the GUI 300.

Figure 4:
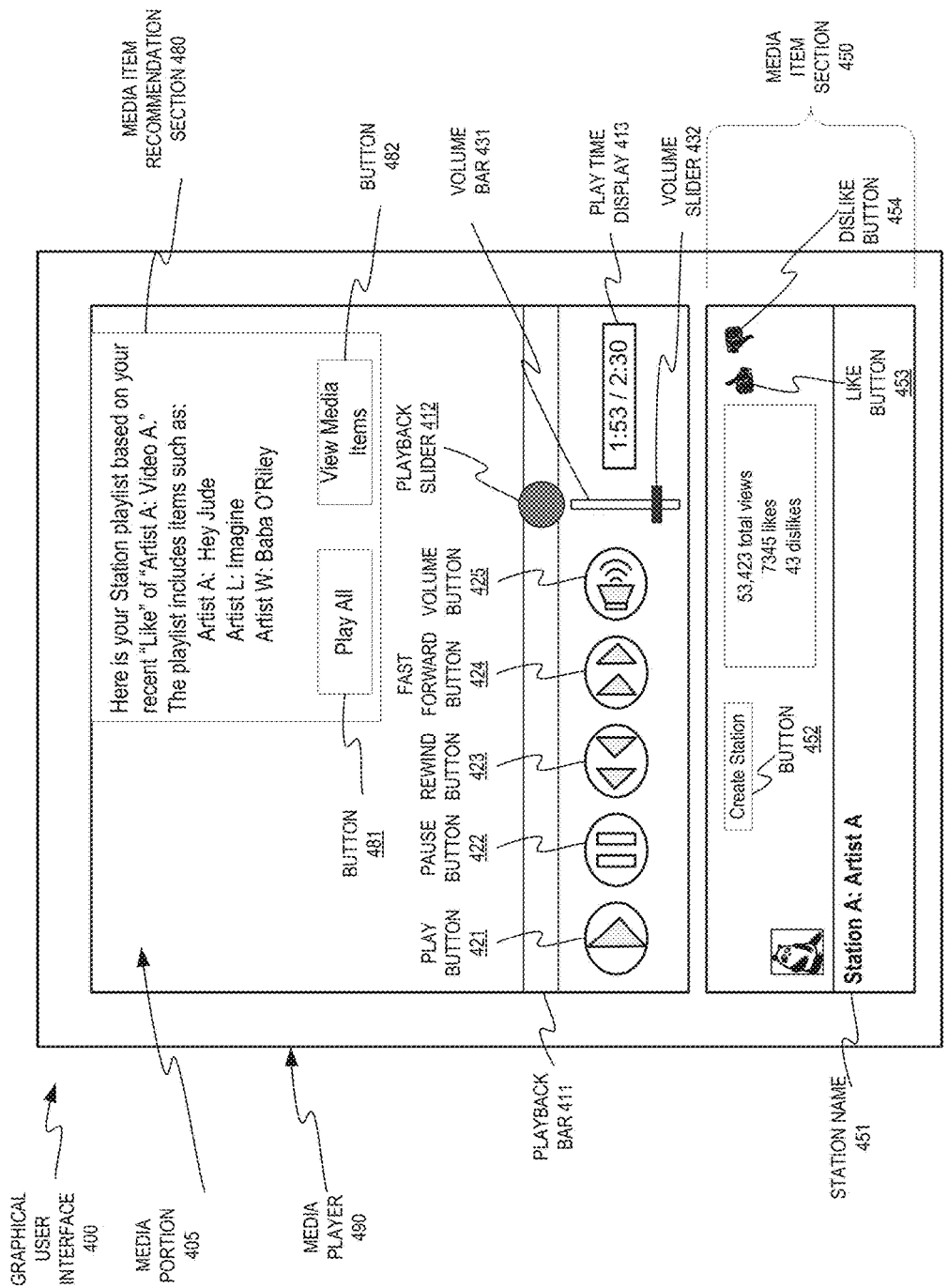
FIG. 4 is a diagram illustrating an example graphical user interface (GUI), in accordance with one implementation of the present disclosure.

FIG. 4 is a diagram illustrating an example graphical user interface (GUI), in accordance with one implementation of the present disclosure. In one implementation, the GUI 400 may be part of a media viewer 111 provided by a server (e.g., server 130 as illustrated and discussed above in conjunction with FIG. 1). For example, the GUI 400 may be part of media viewer 111 that is embedded in a web page (e.g., an embedded media viewer such as a Flash® player or a hypertext markup language-5 (HTML5)-based player) and the GUI 400 may be rendered by a web browser executing on a user device (e.g., user device 110A though user device 110Z). In another implementation, the GUI 400 may be part of media viewer 111 that may be separate from a web page/web browser (e.g., may be a standalone media viewer and/or application). For example, the media viewer 111 may be a separate application (e.g., an app) that is executing on the user device (e.g., user device 110A though user device 110Z). Referring back to FIG. 3, the GUI 400 may be displayed to the user when the user selects a media item from media item list 350 or a play station button, such as button 320, button 325, and button 340.

The GUI 400 includes media viewer controls which may be used to control the consumption of the media items (e.g., digital videos and/or digital music) and receive feedback from the user device (e.g., user device 110A though user device 110Z). The media viewer controls include a play button 421, a pause button 422, a rewind button 423, a fast forward button 424, and a volume button 425. The play button 421 may allow a user to begin and/or restart playback of the media items. In one implementation, the user's interaction with the play button 421 may be used as implicit feedback. The pause button 422 may allow a user to pause and/or un-pause playback of media items. In one implementation, the user's interaction with the pause button 422 may be used as implicit feedback. The rewind button 423 may allow a user to rewind playback, move and/or skip to an earlier point in time in the media items. In one implementation, the user's interaction with the rewind button 423 may be used as implicit feedback. The fast forward button 424 may allow a user to fast forward playback, move, and/or skip to a later point in time in the media items. In one implementation, the user's interaction with the fast forward button 424 may be used as implicit feedback.

The GUI 400 also includes a play time display 413, a playback bar 411, and a playback slider 412. The play time display 413 may display a current play time and/or a total play time for the media items. For example, a total play time (e.g., the total length) of media item may be 2 minutes and 30 seconds (e.g., 2:30). The current play time may be current time/position in the playback of media item (e.g., 1 minute and 53 seconds or 1:53). In one implementation, the play time can be used as implicit feedback. Playback slider 412 is positioned on a region of a playback bar 411 that corresponds to the current play time (e.g., 1:53). The playback slider 412 may be adjusted (e.g., dragged) to any other region of the playback bar 411 to adjust the current play time shown in the play time display 413. In one implementation, the user's interaction with the playback slider 412 may be used as implicit feedback. The GUI 400 includes a media portion 405 that may display a media item. For example, media portion 405 may be the portion of the GUI 400 where a video (e.g., a media item) is played. The media portion 405 may also play or display other types of videos, images, music, and/or other media items.

The volume button 425 may allow user to control the volume of sounds, music, and/or other audible noises in the videos. In one implementation, the volume bar 431 and the volume slider 432 may be displayed when the user clicks and/or activates the volume button 425. For example, the volume bar 431 and the volume slider 432 may not be initially displayed in the GUI 400. After the user clicks the volume button 425, the volume bar 431 and the volume slider 432 may be displayed. The user may move and/or slide the volume slider 432 up and/or down along the volume bar 431 to control the volume of sounds, music, and/or other audible noises in the videos. For example, the user may slide the volume slider 432 up to increase the volume or may slide volume slider 432 down to decrease the volume. In one implementation (not shown in the figures), the GUI 400 may also include buttons (e.g., magnifying glass buttons) that allow a user to zoom in and/or zoom out during the consumption of media items. This may allow a user to get a closer view and/or a farther view of the media item.

The GUI 400 also includes media item section 450. The media item section 450 may include information such as the title, a description, number of approvals from other users (e.g. "likes"), number of dislikes, the station that the media item belongs to, and total number of views for the media item. The media item section 450 includes information about the video titled "Video A" such as the title, the station that the video belongs to (e.g., Station A), and the number of views (e.g., 53,423), likes (e.g., 7345), and dislikes (e.g., 43) for the video. In addition, the media item section 450 contains station name 451, which is "Station A: Artist A."

The media item section 450 further includes buttons 452, 453, and 454. Button 452 may allow a user to create a station based on the media item (e.g., seed media item) presented in the media portion 405. For example, a user could be watching a video and decide that he or she wants to create a station. The button 452 may be used to create station X that includes the video titled, "Video A," that is playing in the media portion 405. The button 453 may allow a user to indicate that the user approves of or likes the media item that is playing in the media portion 405. For example, the button 453 may be used to approve of or "like" the video titled, "Video A" that is playing in the media portion 405. The user's action on button 453 (i.e., "like" a media item) may be used as explicit feedback. The button 454 may allow a user to indicate that the user does not like the media item that is playing in the media portion 405. For example, the button 454 may be used to "dislike" the video titled, "Video A." that is playing in the media portion 405. The user's action on button 454 (i.e., "dislike" a media item) may be used as explicit feedback.

The GUI 400 also includes a media item recommendation section 480 that includes information associated with a playlist for the user, generated by user feedback module 135. In one implementation, the media items may be dynamically generated for the user based on user feedback. The media item recommendation section 480 includes information (e.g., text) indicating that a set of media items has been generated for the user based on the user's approval (e.g., "like" of "Artist A: Video A"). The media item recommendation section 480 also includes information (e.g., text) indicating one or more labels and media items (e.g., Artist A: Hey Jude, Artist L: Imagine, Artist W: Baba O'Riley) that may be included in the station list. In other implementations, the media item recommendation section 480 may include additional information (e.g., titles, descriptions, images, icons, and graphics) to represent the one or more media items included in the station. In other implementations, more or less information (e.g., text, images, icons, graphics, etc.) may be included in the media item recommendation section 480. The media item recommendation section 480 also includes button 481 and button 482. When a user activates (e.g., clicks, selects, etc.) button 481, media player 490 may begin playback of the media items included in the station. The order of the playback of media items may be based on a media weight or ranking of the media items. Alternatively, labels may be pseudo-randomly selected and the highest weighted media item associated with the selected label delivered. The button 482 may allow user to view the media items that are included in a station list/playlist.

Figure 5:
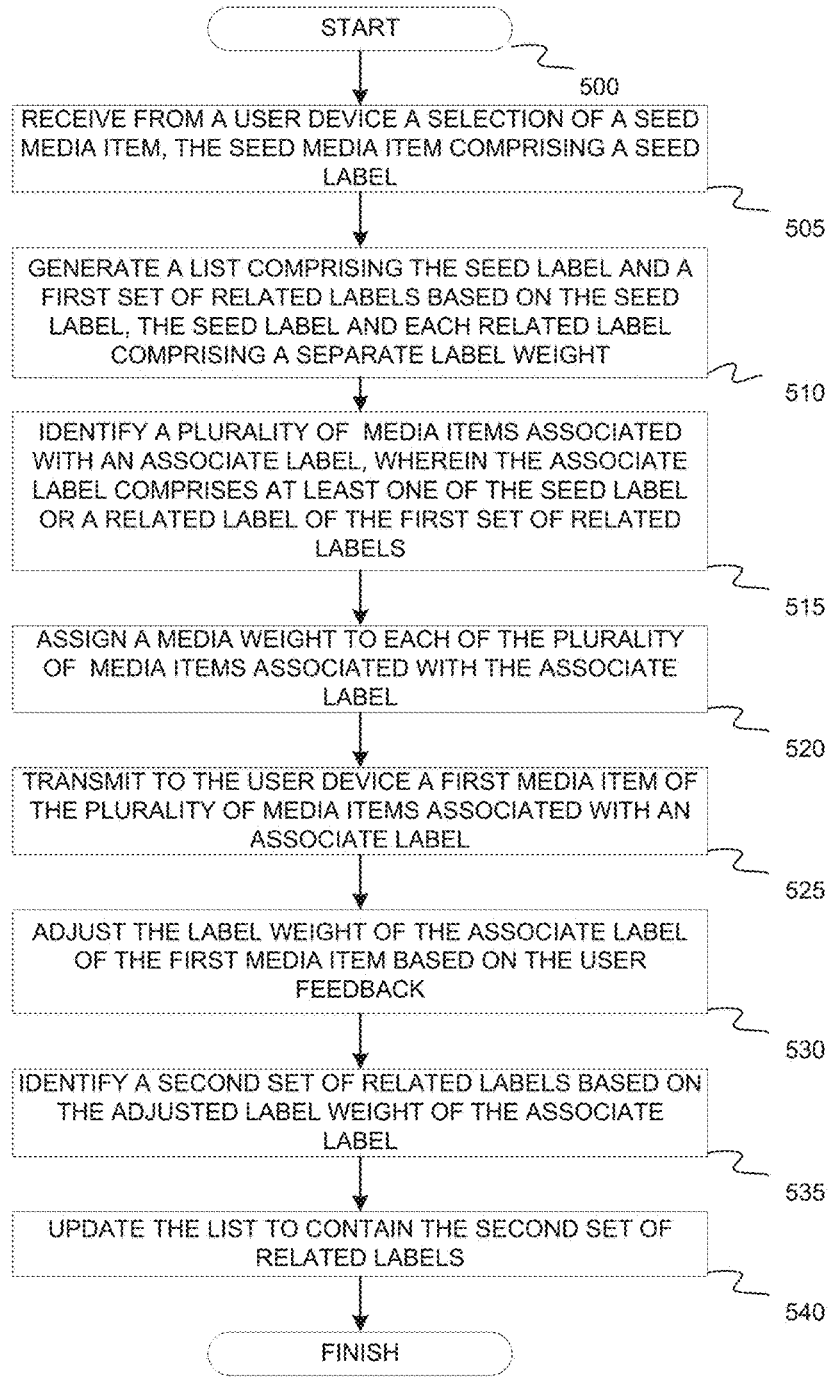
FIG. 5 is a flow diagram illustrating a method for delivering media content to user devices based on user feedback, according to some implementations of the disclosure.

FIG. 5 is a flow diagram illustrating a method for delivering media content to user devices based on user feedback, according to some implementations of the disclosure. The method 500 may be performed by processing logic that comprises hardware (e.g., circuitry, dedicated logic, programmable logic, microcode, etc.), software (e.g., instructions run on a processing device to perform hardware simulation), or a combination thereof. In one implementation, processing logic may perform all or part of the operations of user feedback module 135 to perform all or part of the disclosed method. In another implementation, processing logic may perform all or part of the operations of the data store 106 to perform all or part of the disclosed method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 500 may be performed by user feedback module 135, as shown in FIG. 1 and FIG. 2.

Referring to FIG. 5, in one implementation, method 500 begins at block 505 when processing logic receives from a user device (e.g., user device 110A though user device 110Z) a selection of a seed media item (e.g., media item 125 and media item 128). The seed media item (e.g., media item 125 and media item 128) includes a seed label (e.g., seed label 121 and seed label 123). The seed media item may function as the initial media item on which a station and subsequent selection of related labels (e.g., related label 122 and related label 124) is based. For example, a user may select a media item such as a video of the song, "Video A," by Artist A. When the user decides to create a station, the selected media item, in this case the video, "Video A," may be considered the seed media item (e.g., media item 125 and media item 128). The video, "Video A," has an associated seed label, in this case, the seed label is the artist, "Artist A". Other examples of labels might include "rock," "British," "classic rock," etc.

Method 500 continues to block 510, where processing logic generates a list including the seed label (e.g., seed label 121 and seed label 123) and a first set of related labels (e.g., related label 122 and related label 124) based on the seed label. The seed label and each related label may include a separate label weight. Continuing with the previous example, the artist, "Artist A", is the seed label. Processing logic takes the seed label, Artist A, and finds a group of related artists. The related artists may be, for example, Artist L and Artist W. In one implementation, the set of related labels (e.g., related label 122 and related label 124) may be based on the seed label and popularity, number of "likes" of a community of users, or recent views by a community of users. In another implementation, a set of related labels may be based on the seed label and the user's user history.

It should be noted that since the seed media item (e.g., media item 125 and media item 128) is the first media item the user chooses, there is not an opportunity to receive user feedback on the media items apart from the user selecting the seed media item. As such, method 500 uses the seed media item (e.g., media item 125 and media item 128), and not necessarily current user feedback, to determine a first set of related labels (e.g., related label 122 and related label 124). In another implementation, method 500 uses one or both of the seed media item (e.g., media item 125 and media item 128) and the user's history to determine the related labels.

Figure 7:
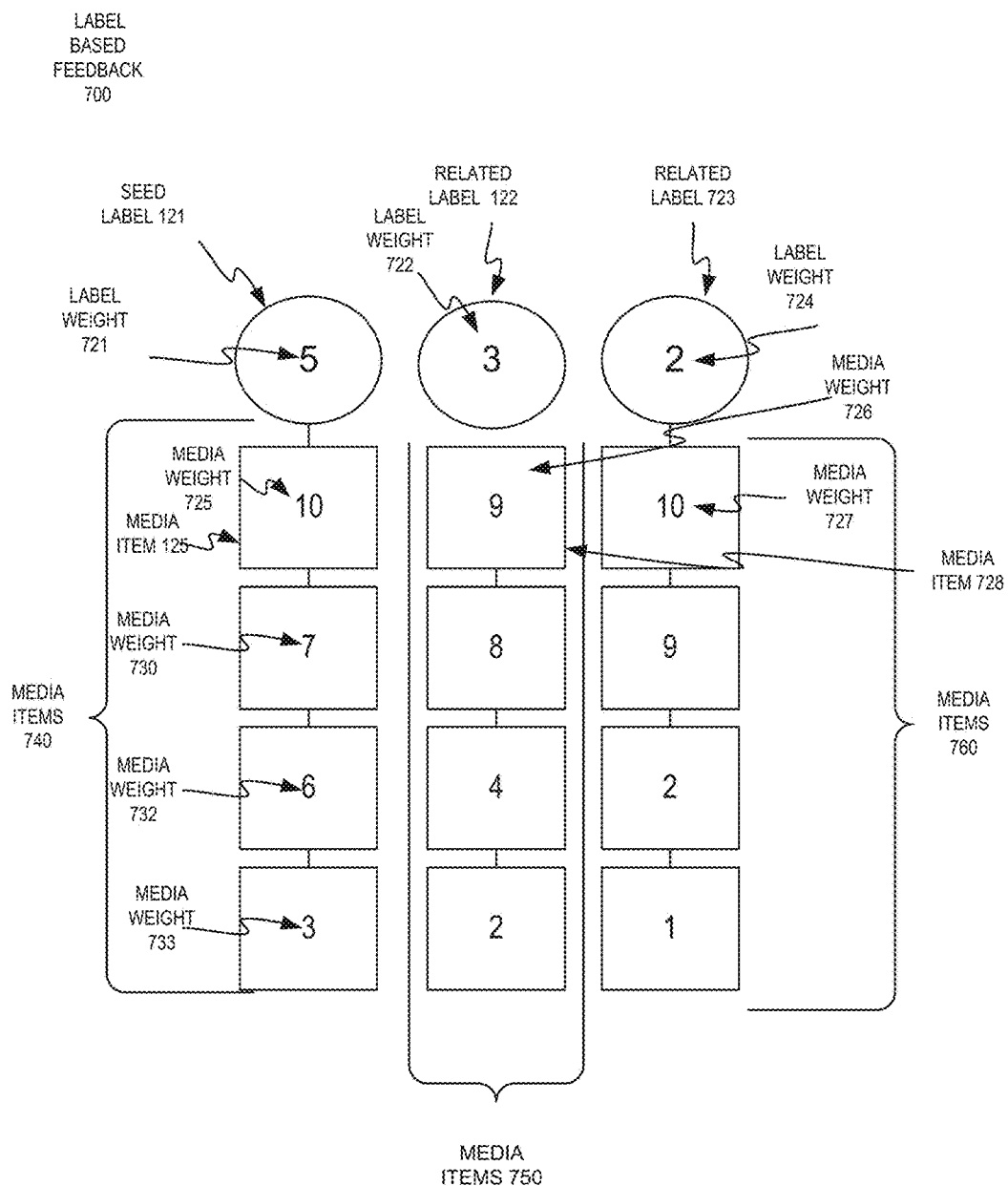
FIG. 7 is a diagram illustrating label based feedback, according to some implementations of the disclosure.

Returning to block 510 of method 500, in one implementation, processing logic may assign a label weight to all the labels, including the seed label (e.g., seed label 121 and seed label 123) and the set of related labels (e.g., related label 122 and related label 124). One example of how user feedback module 135 identifies a set of related labels, in one implementation, can be illustrated using FIG. 7. FIG. 7 is a diagram illustrating label based feedback, according to some implementations of the disclosure. In FIG. 7, seed label 121 has been assigned label weight 721 of a value of "5." Related label 122 has been assigned a label weight 722 of a value of "3," and related label 723 has been assigned a label weight 724 of a value of "2." In one implementation, processing logic assigns various weights as label weights (e.g. label weight 721, label weight 722, and label weight 723). In another implementation, a network administrator assigns various weights as label weights. In one implementation, the seed label, (e.g., seed label 121) is initially assigned a higher weight than the related labels (e.g., related label 122 and related label 723), because the seed media item is the initial user selection. As such, the seed media item reflects the user's desired media content, and the desire may be appropriately reflected with a larger initial label weight, like label weight 721. In one implementation, label weights (e.g., label weight 721, label weight 722, and label weight 724) may change based on user feedback, and the seed label 121 may not reflect the highest label weight. In one implementation, the label weights may be initialized at predetermined values. For example, label weight 721 of seed label 121 may be initialized at a value of "6" while all the label weights of related labels (e.g. label weight 722 of related label 122) are initially assigned a value of "3."

Method 500 continues to block 515, wherein processing logic identifies multiple media items associated with an associate label, wherein the associate label includes at least one of the seed label (e.g., seed label 121) or a related label of the first set of labels (e.g., related label 122 and related label 723). When a label (e.g. seed label 121 or related label 122) is associated with media items (e.g., media item 125 or media item 728, respectively), the label may be considered an associate label. Returning to FIG. 7 for purposes of illustrating method 500. Media items, such as videos, may be associated with labels, such as artists. For example, the artist, Artist A, may have numerous associated media items (e.g., videos). In FIG. 7, media items 740 are associated with seed label 121 (e.g., associate label), media items 750 are associated with related label 122 (e.g., associate label), and media items 760 are associated with related label 723 (e.g., associate label).

Method 500 continues to block 520, wherein processing logic, in one implementation, assigns a media weight to each of the multiple media items associated with the associate label. In FIG. 7, media items 740 are associated with seed label 121. Each media item of the multiple media items 740 has a media weight. For example media item 125 has a media weight of "10." The subsequent individual media items of media items 740 has a media weight 730 value of "7," media weight 732 value of "6," and media weight 733 value of "3." In one implementation, the set of media weights (e.g., media weight 725, media weight 730, media weight 732, and media weight 733) may be based on popularity, number of "likes" of a community of users, or recent views by a community of users. In another implementation, media weights (e.g., media weight 725, media weight 730, media weight 732, and media weight 733) may be based on the user's user history stored. In one implementation, processing logic assigns various weights as media weights (e.g., media weight 725, media weight 730, media weight 732, and media weight 733). In another implementation, a network administrator assigns various weights as media weights (e.g., media weight 725, media weight 730, media weight 732, and media weight 733).

Method 500 continues to block 525, wherein processing logic transmits to the user a first media item of the multiple media items with an associate label. In FIG. 7, all the labels (e.g., seed label 121, related labels 122, and related label 723) have been associated with media items (e.g., media items 740, media items 750, and media items 760, respectively). Processing logic may choose a media item out of all the media items (e.g., media items 740, media items 750, and media items 760) to transmit to the user device. In one implementation, processing logic randomly selects a label (e.g., seed label 121, related label 122, or related label 723) and chooses the media item with the highest media weight. In another implementation, processing logic selects the label (e.g., seed label 121, related label 122, or related label 723) that has not yet been consumed by the user and selects the media item with the highest weight. In one implementation, processing logic more often selects labels with a higher label weight, and selects the media item of the label with the highest weight.

Method 500 continues to block 530, wherein processing logic adjusts the label weight (e.g., label weight 721, label weight 722, or label weight 724) of the associate label (e.g., seed label 121, related label 122, or related label 723) of the first media item based on a user feedback, wherein the user feedback is received from the user device (e.g., user device 110A though user device 110Z) for the first media item. For example, media item 728 under related label 122 (e.g., associate label) may be the first media item transmitted to the user. If the user performs an implicit or explicit feedback, for example a "like," of media item 728, label weight 722 is adjusted for the media item 728. In one implementation, since the feedback is a positive explicit feedback, label weight 722 of related label 122 may be increased from a value of "3" to a value of "4," an increase of 1. In another implementation, if the user feedback is a negative explicit feedback, for example, a "dislike," label weight 722 of related label 122 may be decreased from a value of "3" to a value of "2," a decrease of 1. In one implementation, if the user feedback is a positive implicit feedback, for example, a long watch action, label weight 722 of related label 122 may be increased from a value of "3" to a value of "3.33," an increase of 0.34. In another implementation, if the user feedback is a negative implicit feedback, for example, a skip action, label weight 722 of related label 122 may be decreased from a value of "3" to a value of "1.66," a decrease of 0.34. In one implementation, different types of user feedback user feedback of different users may increase or decrease the label weight by different values as determined by processing logic.

In one implementation, method 500 continues to block 535, wherein processing logic identifies a second set of related labels based on the adjusted label weight of the associate label. For example, returning to FIG. 7, if a user watches media item 728 associated with related label 122 and "likes" media item 728 and also performs a long watch action, the label weight 722 may increase from a value of "3" to a value of "4.34" (i.e., label weight 722 of (3) plus a positive explicit feedback "like" (1) plus a positive implicit long watch (0.34)=adjusted label weight of (4.34)). As a result, the processing logic may identify a second set of related labels related to related label 122. Alternatively, if the user feedback reduces the label weight 722 of related label 122 from a value of "3" to a value of "1.64," processing logic may identify labels that are unrelated to related label 122, but related to the seed label 121 and/or to related label 723. In one implementation, labels with low label weights may be replaced by the second set of related labels. Method 500 continues to block 510, wherein processing logic updates the list to contain the second set of related labels. Returning to FIG. 7, if the label weight 722 or related label 122 increases or decreases, processing logic updates the list of related labels based on the adjusted label weight. In one implementation, processing logic identifies and associates new and additional media items for the updated list of related labels.

Figure 6:
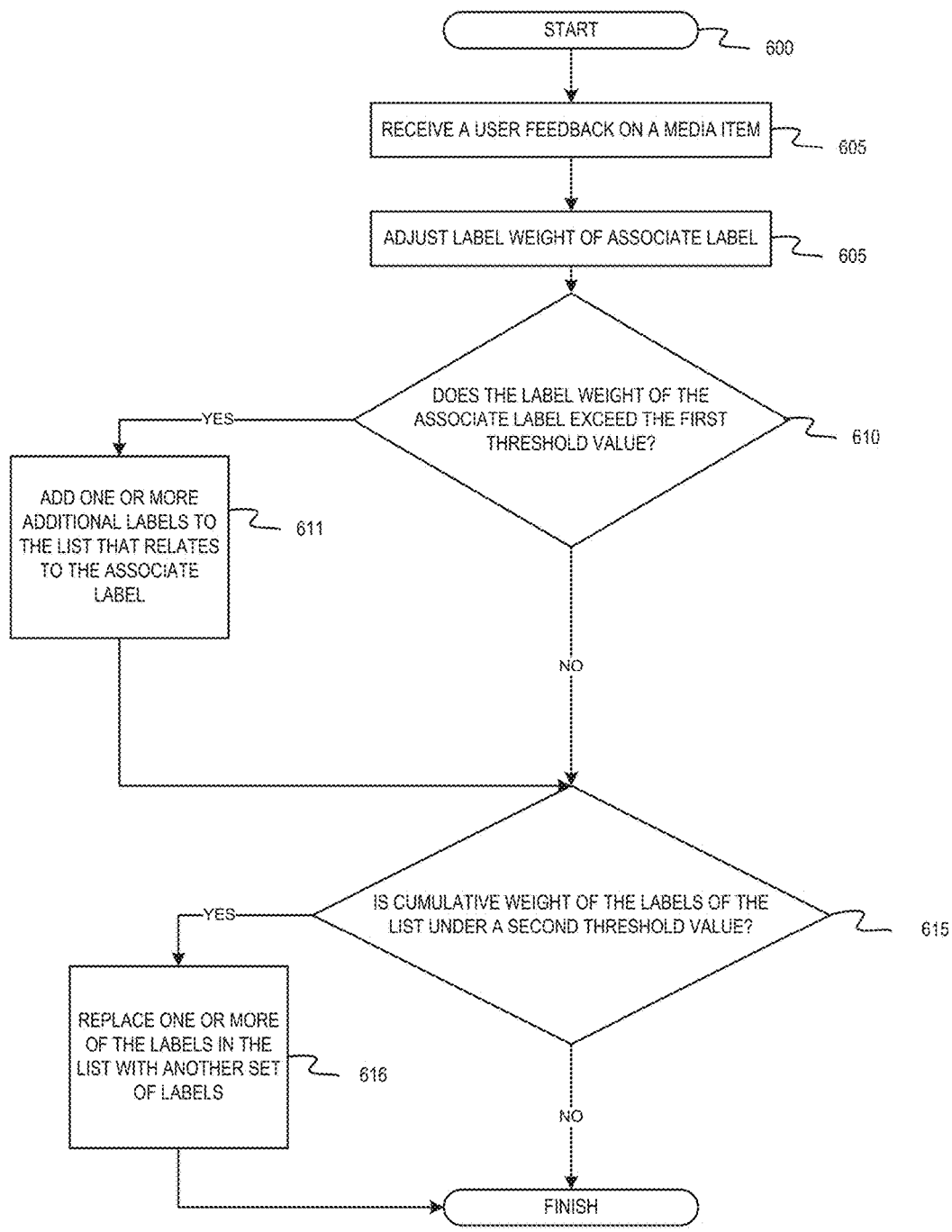
FIG. 6 is a flow diagram illustrating a method for delivering media content to user devices based on user feedback, according to some implementations of the disclosure.

In order to help aid in the understanding of the present disclosure, an illustrative example of an application of the flow diagram in FIG. 6 is provided as follows. A user may select an initial video (e.g., seed media item), for example, a music video, and create a station based on the initial video. The initial video has at least one artist (e.g., a seed label). From the initial artist, additional related artists (e.g., associate labels) are determined. The related artists may be determined by community popularity, recent activity, or by other methods. Thus, a group or list of artists is generated; the list includes the initial artist and related artists. Each of the artists may be assigned a weight (e.g., label weight). From the list of artists, videos (e.g., media items) by the initial artist and the related artists are selected. These videos may populate the station; and may be considered a baseline or initial set of videos for the station. Each of the videos may be assigned a weight (e.g., media weight). As the videos are consumed by the user, the user provides feedback on the videos. The feedback may be implicit, explicit, and/or temporal. As the user provides feedback, the weights assigned to the artists (e.g., label weights) are adjusted accordingly. For example, if a video receives negative feedback, the weight of the artist associated with the video may decrease. If a video receives positive feedback, the weight of the artist associated with the video may increase. Moreover, depending on the type of feedback, the adjusted weight may be more or less. For example, if the feedback is an explicit "like" of a video, it is a strong indication the user actually likes the artist, and the associated artist weight may be adjusted more than if the feedback (e.g. implicit feedback) is a long watch of a video. As the weights for the artists are adjusted, some artists may be removed from the station and some artists may be added to the station. As the artists of a station are adjusted, the method presented above may be used iteratively. For example, as new artists populate the station, new videos associated with the new artists may also populate the station. Likewise, when artists are removed from the station, the associated videos of the removed artist may also be removed. As the user continually consumes the videos of a station, feedback is received, label weights are adjusted, and media content of the station adjusted, etc.

FIG. 6 is a flow diagram illustrating a method for delivering media content to user devices based on user feedback, according to some implementations of the disclosure. The method 600 may be performed by processing logic that comprises hardware (e.g., circuitry, dedicated logic, programmable logic, microcode, etc.), software (e.g., instructions run on a processing device to perform hardware simulation), or a combination thereof. In one implementation, processing logic may perform all or part of the operations of user feedback module 135 to perform all or part of the disclosed method. In another implementation, processing logic may perform all or part of the operations of the data store 106 to perform all or part of the disclosed method.

In one implementation, method 600 begins at block 605 when processing logic receives from a user device (e.g., user device 110A though user device 110Z) feedback on a media item (e.g., media item 728). At block 605, processing logic adjust the label weight 722 of the related label 122 (i.e., associate label, associated with media item 728). At block 610, processing logic compares the adjusted label weight (i.e., label weight 722) of the associate label (i.e., related label 122) to a first threshold value. If the adjusted label weight (i.e., label weight 722) of associate label (i.e., related label 122) exceeds the first threshold value, for example a value of "5," processing logic adds one or more additional labels to the list (e.g., station list) that relate to the associate label (i.e., related label 122). In one implementation, the additional labels may be related to the associate label (i.e., related label 122) based on popularity, number of "likes" of a community of users, or recent views by a community of users. In another implementation, the additional labels may be related to the associate label (i.e., related label 122) based on the user's user history stored. In one implementation, processing logic identifies and associates additional media items for the additional labels. The additional labels are added to the station list of media items.

In one implementation, regardless if the adjusted label weight (i.e., label weight 722) of associate label (i.e., related label 122) exceeds the first threshold value, method 600 proceeds to block 615 where processing logic compares the cumulative weight of the separate label weights of the list (e.g., station list). Returning to FIG. 7 for purposes of illustration. In FIG. 7, the list of labels includes seed label 121, related label 122, and related label 723. Media items (e.g., media items 740, media items 750, and media items 760) have been associated with seed label 121, related label 122, and related label 723, respectively. In other words, seed label 121, related label 122, and related label 723 may be considered associate labels since they have been associated with media items (i.e., media items 740, media items 750, and media items 760, respectively). Each label (e.g., seed label 121, related label 122, and related label 72) is initially assigned by processing logic a separate label weight (e.g., label weight 721, label weight 722, and label weight 724). As the user consumes media items and provides implicit and explicit feedback, processing logic adjusts the separate label weights (e.g., label weight 721, label weight 722, and label weight 724) associated with the consumed media items. In block 615 of method 600, processing logic takes the cumulative weight of the separate label weights (e.g., label weight 721, label weight 722, and label weight 724). For example, label weight 721 has a value of "5," label weight 722 has a value of "3", and label weight 724 has a value of "2." In another implementation, processing logic takes the cumulative weight of the related labels (e.g., related label 122 and related label 723), while leaving out the label weight (e.g., label weight 721) of the seed label (e.g., 121). The cumulative weight is compared to a second threshold value. In block 616 of method 600, if the cumulative weight is under the second threshold value, one or more of the related labels (e.g., related label 122 and related label 723) are replaced with a second set of related labels. The second set of related labels are related or based on the seed label (e.g. seed label 121). For example if the cumulative weight is "10" and the second threshold value is "15," then processing logic may select a second set of related labels and replace some, all, or none of the related labels in the station list.

Figure 8:
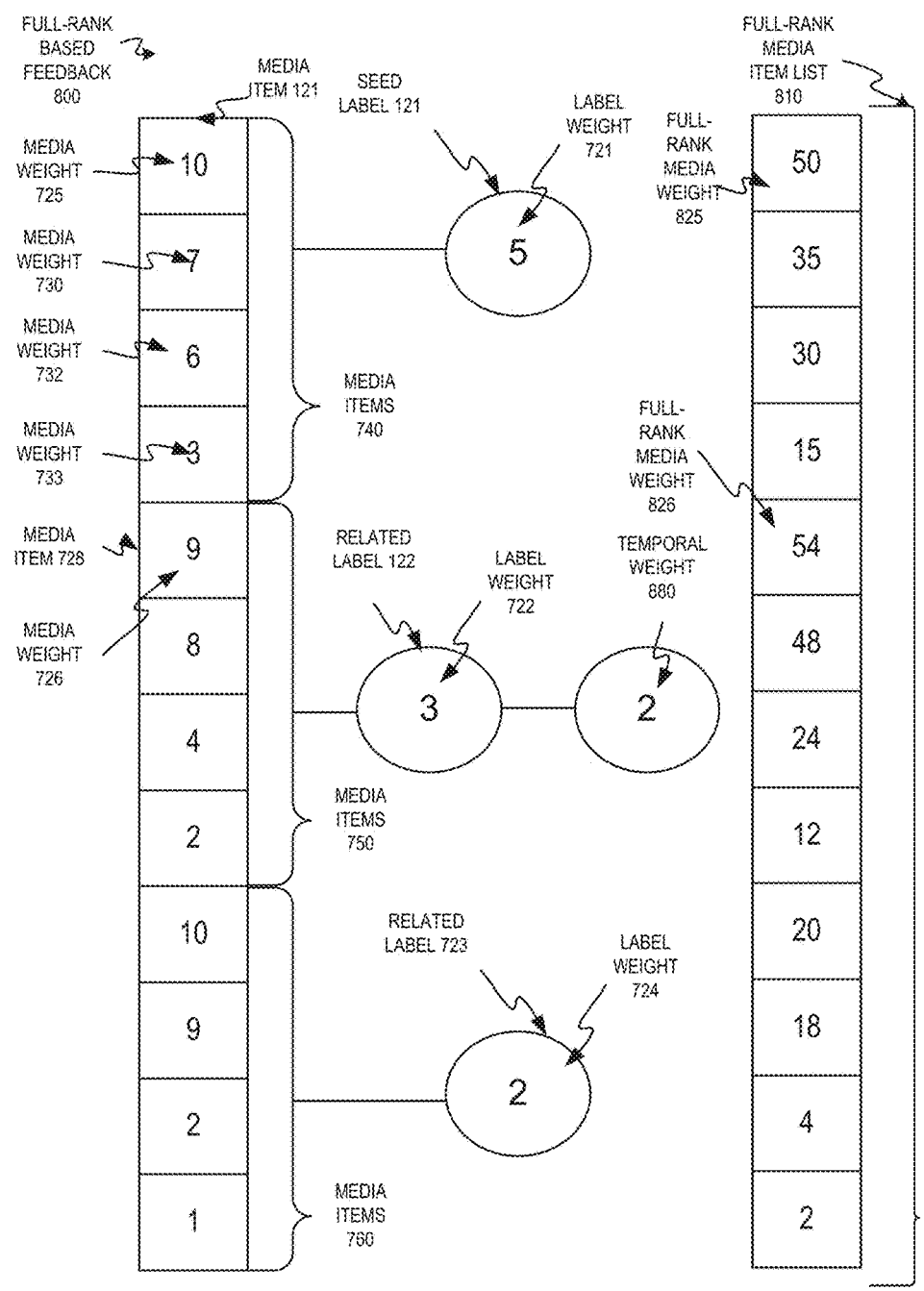
FIG. 8 is a diagram illustrating full-rank based feedback, according to some implementations of the disclosure.

FIG. 8 is a diagram illustrating full-rank based feedback, according to some implementations of the disclosure. Full-rank based feedback 800 may be used in conjunction with the method 500 and method 600, presented above. Processing logic receives a seed media item from a user device (e.g., user device 110A through user device 110Z). The seed media item includes a seed label (e.g., seed label 121). Processing logic generates a list of labels including the seed label and related labels (e.g., related label 122 and related label 723), the related labels are based on the seed label. The processing logic assigns the seed label and the related labels an initial label weight (e.g., label weight 721, label weight 722, and label weight 724). The seed label and the related labels are part of a list, or list of labels, and belong to a user created station. Processing logic associates media items (e.g., media items 740, media items 750, and media items 760, respectively) with seed label 121, related label 122, and related label 723. In other words, seed label 121, related label 122, and related label 723 may be considered associate labels since they have been associated with media items (i.e., media items 740, media items 750, and media items 760, respectively). The media items are included in the station playlist. Each label (e.g., seed label 121, related label 122, and related label 72) is initially assigned, by processing logic, a separate label weight (e.g., label weight 721, label weight 722, and label weight 724). As the user consumes media items and provides implicit and explicit feedback, processing logic adjust the separate label weights associated with the consumed media items.

In one implementation, a full-rank weight for each media item (e.g., media items associated with an associated label) may be calculated. Each media item (e.g., media items 740, media items 750, and media items 760, respectively) has an associated media weight (e.g., media weight 725, media weight 730, media weight 732, and media weight 733 for media items 740) and an associate label. For example, seed label 121 is the associate label for media items 740, related label 122 is the associate label for media items 750, and related label 723 is the associate label for media items 760. In order to calculate the full-rank for each media item, the media items may be multiplied by various weights. The initial media weight for the media items may be based on popularity, user history, or other criteria. Additionally, in FIG. 8, the media weight of media items 740 are multiplied by the label weight 721 of their associated label, seed label 121. For example, media weight 725 with a value of "10" is multiplied by label weight 721 with a value of "5" to generate full-rank media weight 825 with a value of "50." In one implementation, every media item of station (e.g., media items 740, media items 750, and media items 760) may have a full-rank media weight (e.g., full-rank media weight 825).

In another implementation, a full-rank weight for each media item may be calculated using various different weights. In one implementation, the label weight (e.g., label weight 722) of the associate label (e.g., related label 122) is adjusted based on a temporal relation to the user feedback. Adjusting label weight based on a temporal relation may occur, for example, when feedback is received within 30 minutes of the current time. Such feedback has a positive temporal relation and may be weighed more heavily than feedback received outside of 30 minutes from the current time (i.e., negative temporal feedback). In FIG. 8, temporal weight 880 with a value of "2," may be multiplied with label weight 722 with a value of "3," generating a value of "6." Temporal weight 880 with a value of "2," may be multiplied with label weight 722 with a value of "3," and be further multiplied with the media weights (e.g., media weight 726) to generate a full-rank media weight (e.g., full-rank media weight 826). For example, media item 728 with media weight 726 with value of "9" may be multiplied by label weight 722 with a value of "3," and multiplied by temporal weight 880 with a value of "2," to generate a full-rank media weight 826 with a value of "54" for media item 728. A list of all the media items that have a full-rank may be listed in full-rank media item list 810. In one implementation, full-rank based feedback allows for a single ranked list of media items. In another implementation, processing logic may choose media items from the full-rank media item list 810 to transmit to a user device (e.g., user device 110A through 110Z) based on the highest full-rank media weight (e.g., full-rank media weight 825). In an alternative implementation, some or all of the label weights of the list may be adjusted by a temporal relation to user feedback. In another implementation, some or all of the label weights of a list may be adjusted by other criteria such as user history, lists of other stations created by the user, etc.

It should be noted, however, that although the present disclosure may be discussed at times in relation to artists and videos for ease of explanation, the present disclosure is not limited to artists and videos. In alternative implementations, the media item may be other types of media content that can be consumed (e.g., view, watch, listen, hear, or read) by a user such as radio, documents, books, news feeds, photos, etc. In alternative implementations, labels may be sub-artists (e.g., the Beatles at different musical periods), genre (e.g., classical), sub-category of artists (e.g., parodies of Lady Gaga), news programs, political programs, sources of news, sports programs, sub-categories of each, eras, styles, hot tracks, etc. For example, a user may create a station with a label for football videos, or for fashion videos, or photos of craftsman-style architecture, etc.

Figure 9:
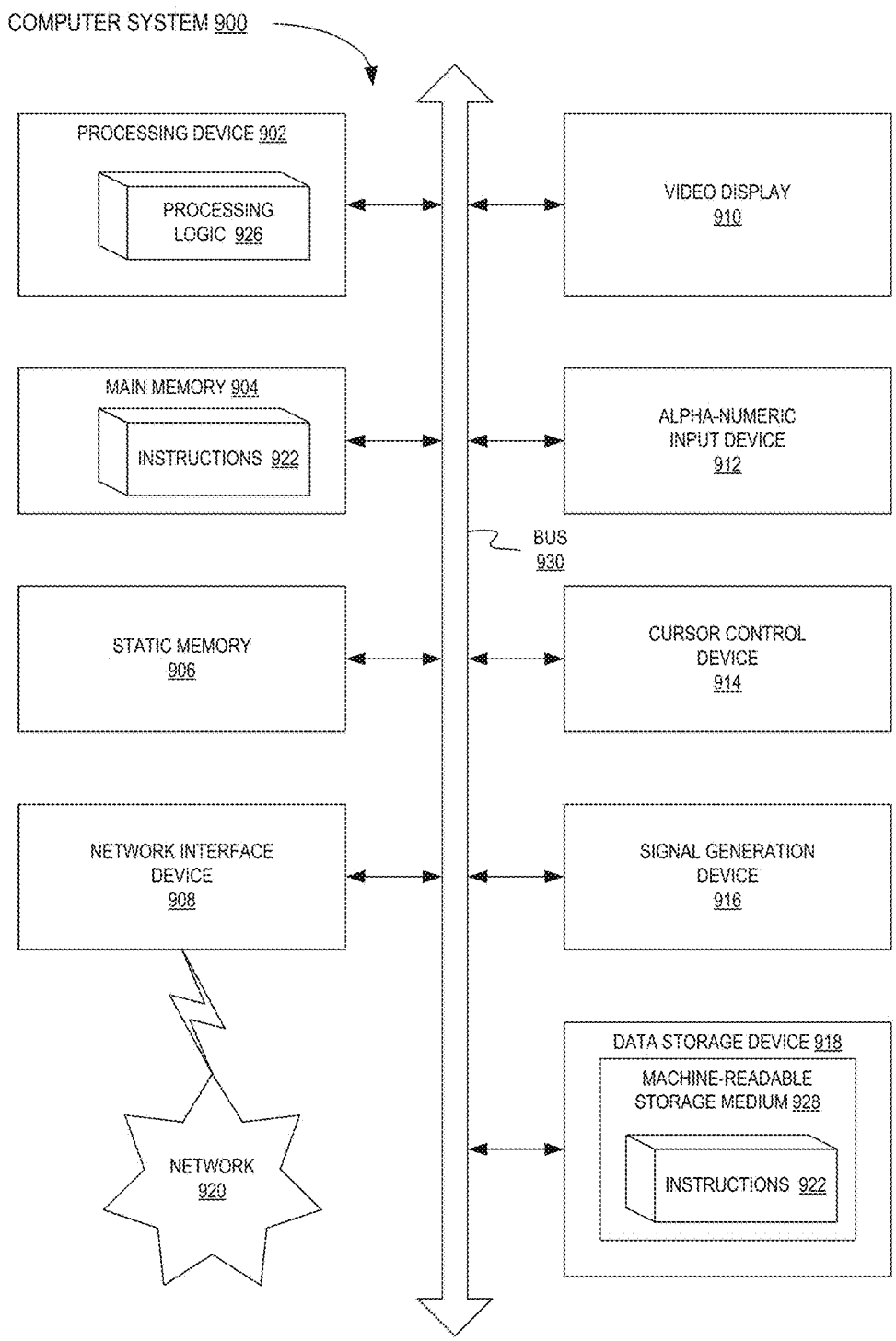
FIG. 9 is a block diagram illustrating an exemplary computer system, according to some implementations.

FIG. 9 illustrates a diagrammatic representation of a machine in the exemplary form of a computer system 900 within which a set of instructions, for causing the machine to perform any one or more of the methodologies discussed herein, may be executed. In alternative implementations, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one implementation, computer system 900 may be representative of a user device, such as user devices 110A-110Z, or of a server, such as server 130, running user feedback module 135.

The exemplary computer system 900 includes a processing device 902, a main memory 904 (e.g., read-only memory (ROM), flash memory, dynamic random access memory (DRAM) (such as synchronous DRAM (SDRAM) or Rambus DRAM (RDRAM), etc.), a static memory 906 (e.g., flash memory, static random access memory (SRAM), etc.), and a data storage device 918, which communicate with each other via a bus 930. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 902 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 is configured to execute processing logic 926 for performing the operations and steps discussed herein.

The computer system 900 may further include a network interface device 908. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 916 (e.g., a speaker).

The data storage device 918 may include a machine-readable storage medium 928, on which is stored one or more set of instructions 922 (e.g., software) embodying any one or more of the methodologies of functions described herein. The instructions 922 may also reside, completely or at least partially, within the main memory 904 and/or within the processing device 902 during execution thereof by the computer system 900; the main memory 904 and the processing device 902 also constituting machine-readable storage media. The instructions 922 may further be transmitted or received over a network 920 via the network interface device 908.

The machine-readable storage medium 928 may also be used to store instructions to perform a method dynamically providing and adapting media content for a user based on user feedback, as described herein. While the machine-readable storage medium 928 is shown in an exemplary implementation to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several implementations of the present disclosure. It will be apparent to one skilled in the art, however, that at least some implementations of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

In situations in which the systems discussed herein collect personal information about users, or may make use of personal information, the users may be provided with an opportunity to control whether programs or features collect user information (e.g., information about a user's history, social actions or activities, profession, feedback, behavior, a user's preferences, or a user's current location), or to control whether and/or how to receive content from the media server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the web server or media server.

Reference throughout this specification to "one implementation" or "an implementation" means that a particular feature, structure, or characteristic described in connection with the implementations included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or."

Although the operations of the methods herein are shown and described in a particular order, the order of the operations of each method may be altered so that certain operations may be performed in an inverse order or so that certain operation may be performed, at least in part, concurrently with other operations. In another implementation, instructions or sub-operations of distinct operations may be in an intermittent and/or alternating manner.

What is claimed is:

1. A method comprising:
   identifying, by a processing device, a first plurality of media items for consumption by a user, wherein the first plurality of media items are associated with a first set of categories, wherein the first set of categories identify one or more characteristics related to one or more of the first plurality of media items and are not the same as the first plurality of media items;
   transmitting, by the processing device, to a user device a first media item of the first plurality of media items, wherein the first media item is associated with a first category of the first set of categories;
   adjusting, by the processing device, a category weight of the first category associated with the first media item in view of a user feedback on the first media item;
   responsive to adjusting the category weight of the first category associated with the first media item in view of the user feedback on the first media item of the first plurality of media items, identifying, by the processing device, an additional category in view of the adjusted category weight of the first category, wherein the additional category is related to the first category, wherein the additional category is not the same as the first plurality of media items; and
   updating, by the processing device, the first set of categories to contain the additional category, wherein a second media item of a second plurality of media items associated with the additional category is selected for transmission to the user device in view of the updated first set of categories.

2. The method of claim 1, wherein identifying the additional category is in response to the adjusted category weight of the first category exceeding a first threshold value.

3. The method of claim 1, further comprising:
   calculating a cumulative weight of category weights associated with the updated first set of categories;
   comparing the cumulative weight of the category weights a second threshold value; and
   replacing one or more categories of the first set of categories with a second set of categories responsive to the cumulative weight being under the second threshold value.

4. The method of claim 1, further comprising:
   assigning a media weight to each of the first plurality of media items.

5. The method of claim 4, wherein transmitting to the user device the first media item is in view of the media weight of each of the first plurality of media items.

6. The method of claim 1, further comprising:
   calculating a full-rank weight for the first media item of the first plurality of media items, the full-rank weight comprising a combination of the adjusted category weight of the first category and a media weight of the first media item of the first plurality of media items.

7. The method of claim 1, wherein the user feedback comprises an explicit user feedback, the explicit user feedback comprising at least one of a like action, a dislike action, a comment, removal action, or a sharing action.

8. The method of claim 1, wherein the user feedback comprises an implicit user feedback, the implicit user feedback comprising at least one of a long watch action or a skip action.

9. The method of claim 1, wherein the category weight of the first category is adjusted in view of a temporal relation to the user feedback.

10. The method of claim 1, wherein each of the first set of categories is associated with an artist identifier and each of the first plurality of media items is associated a video identifier.

11. A non-transitory machine-readable storage medium storing instructions that, responsive to execution by a processing device, cause the processing device to perform operations comprising:
    identifying, by the processing device, a first plurality of media items for consumption by a user, wherein the first plurality of media items are associated with a first set of categories, wherein the first set of categories identify one or more characteristics related to one or more of the first plurality of media items and are not the same as the first plurality of media items;
    transmitting, by the processing device, to a user device a first media item of the first plurality of media items, wherein the first media item is associated with a first category of the first set of categories;
    receiving, by the processing device, a user feedback on the first media item;
    responsive to determining that the user feedback on the first media item is positive, identifying, by the processing device, an additional category related to the first category, wherein the additional category is not the same as the first plurality of media items; and
    updating the first set of categories to contain the additional category, wherein a second media item of a second plurality of media items associated with the additional category is selected for transmission to the user device in view of the updated first set of categories.

12. The non-transitory machine-readable storage medium of claim 11, wherein determining that the user feedback on the first media item is positive comprises:
    adjusting a category weight of the first category associated with the first media item in view of the user feedback; and
    determining the adjusted category weight of the first category exceeds a first threshold value.

13. The non-transitory machine-readable storage medium of claim 11, the operations further comprising:
    calculating a cumulative weight of category weights associated with the updated first set of categories;
    comparing the cumulative weight of the category weights to a second threshold value; and replacing one or more categories of the first set of categories with a second set of categories responsive to the cumulative weight being under the second threshold value.

14. The non-transitory machine-readable storage medium of claim 11, the operations further comprising:
assigning a media weight to each of the first plurality of media items.

15. The non-transitory machine-readable storage medium of claim 14, wherein transmitting to the user device the first media item is in view of the media weight of each of the first plurality of media items.

16. The non-transitory machine-readable storage medium of claim 12, the operations further comprising:
calculating a full-rank weight for the first media item of the first plurality of media, the full-rank weight comprising a combination of the adjusted category weight of the first category and a media weight of the first media item of the first plurality of media items.

17. A server computer system comprising:
a memory; and
a processing device, operatively coupled to the memory, the processing device to:
identify a first plurality of media items for consumption by a user, wherein the first plurality of media items are associated with a first set of categories, wherein the first set of categories identify one or more characteristics related to one or more of the first plurality of media items and are not the same as the first plurality of media items;
transmit to a user device a first media item of the first plurality of media items, wherein the first media item is associated with a first category of the first set of categories;
adjust a category weight of the first category associated with the first media item in view of a user feedback on the first media item;
responsive to adjusting the category weight of the first category associated with the first media item in view of the user feedback on the first media item, identify an additional category in view of the adjusted category weight of the first category, wherein the additional category is related to the first category, wherein the additional category is not the same as the first plurality of media items; and
update the first set of categories to contain the additional category, wherein a second media item of a second plurality of media items associated with the additional category is selected for transmission to the user device in view of the updated first set of categories.

18. The server computer system of claim 17, wherein to identify the additional category is in response to the adjusted category weight of the first category exceeding a first threshold value.

19. The server computer system of claim 17, the processing device further to:
calculate a cumulative weight of the category weights associated with the updated first set of categories;
compare the cumulative weight of the category weights to a second threshold value; and
replace one or more categories of the first set of categories with a second set of categories responsive to the cumulative weight being under the second threshold value.

20. The server computer system of claim 17, the processing device further to:
calculate a full-rank weight for the first media item of the first plurality of media items, the full-rank weight comprising a combination of the adjusted category weight of the first category and a media weight of the first media item of the first plurality of media items.

* * * * *